United States Patent
Carre et al.

(10) Patent No.: US 12,049,325 B2
(45) Date of Patent: Jul. 30, 2024

(54) SYSTEM FOR CONTROLLING AN AIRCRAFT ELECTRICAL NETWORK

(71) Applicant: SAFRAN ELECTRICAL & POWER, Blagnac (FR)

(72) Inventors: Nicolas Carre, Blagnac (FR); Philippe Delbosc, Blagnac (FR)

(73) Assignee: SAFRAN ELECTRICAL & POWER, Blagnac (FR)

( * ) Notice: Subject to any disclaimer, the term of this patent is extended or adjusted under 35 U.S.C. 154(b) by 442 days.

(21) Appl. No.: 17/439,310

(22) PCT Filed: Mar. 5, 2020

(86) PCT No.: PCT/FR2020/050445
§ 371 (c)(1),
(2) Date: Sep. 14, 2021

(87) PCT Pub. No.: WO2020/188178
PCT Pub. Date: Sep. 24, 2020

(65) Prior Publication Data
US 2022/0153425 A1    May 19, 2022

(30) Foreign Application Priority Data
Mar. 15, 2019  (FR) .................................. 1902661

(51) Int. Cl.
*B64D 31/14*    (2006.01)

(52) U.S. Cl.
CPC .......... *B64D 31/14* (2013.01); *B64D 2221/00* (2013.01)

(58) Field of Classification Search
CPC .... B64D 31/14; B64D 2221/00; B64D 33/00; B64D 41/00; H02J 2310/44; H02J 4/00; Y02T 50/50
(Continued)

(56) References Cited

U.S. PATENT DOCUMENTS

| | | | | |
|---|---|---|---|---|
| 2012/0063777 A1* | 3/2012 | Tanaka | ............... | H04Q 11/0067 398/47 |
| 2013/0086919 A1* | 4/2013 | Dooley | ................... | B64C 27/12 60/778 |

(Continued)

FOREIGN PATENT DOCUMENTS

| | | |
|---|---|---|
| CA | 2587067 A1 | 11/2007 |
| EP | 1852347 A1 | 7/2007 |

(Continued)

OTHER PUBLICATIONS

International Search Report, English Translation of the International Search Report, and Written Opinion issued on Jul. 17, 2020 in International Patent Application No. PCT/FR2020/050445 (12 pages).

*Primary Examiner* — Yonel Beaulieu
*Assistant Examiner* — Jean W Charleston
(74) *Attorney, Agent, or Firm* — Bookoff McAndrews, PLLC

(57) ABSTRACT

A system for controlling an aircraft power network including at least a first propulsion assembly having at least one left-hand starter-generator and a second propulsion assembly having at least one right-hand starter-generator as well as other electrical motors, the system including first and second power electronics boxes each including at least two so-called generic control boards for controlling the power network, each of these at least two generic control electronics boards being connected by a fast communication link to separate first and second data switches, the first and second data switches of the first power electronics box being respectively connected to the first and second data switches of the second power electronics box by a first fast communication bus.

13 Claims, 4 Drawing Sheets

(58) Field of Classification Search
USPC .............................................................. 701/3
See application file for complete search history.

(56) References Cited

U.S. PATENT DOCUMENTS

| | | | | |
|---|---|---|---|---|
| 2015/0311832 A1* | 10/2015 | Solodovnik | ............... | H02J 1/14 |
| | | | | 318/51 |
| 2016/0129862 A1* | 5/2016 | Henrard | .................... | H02J 4/00 |
| | | | | 307/9.1 |
| 2016/0179151 A1* | 6/2016 | Ibrahim | .............. | H04L 67/1078 |
| | | | | 700/295 |
| 2016/0341128 A1* | 11/2016 | Juarez Becerril | ... | F02N 11/0803 |
| 2016/0347480 A1* | 12/2016 | Ferreira | .................. | B64G 1/52 |
| 2017/0225798 A1* | 8/2017 | Guillot | ................... | B64D 41/00 |
| 2017/0247114 A1* | 8/2017 | Moulon | .................. | B64C 27/12 |
| 2019/0001955 A1* | 1/2019 | Gansler | .................. | B64D 35/08 |
| 2019/0039716 A1* | 2/2019 | Jacquemoud-Collet | ..................... | |
| | | | | H02J 3/00 |

FOREIGN PATENT DOCUMENTS

| | | |
|---|---|---|
| FR | 2903511 A1 | 1/2008 |
| KR | 2016-0036657 A | 4/2016 |
| WO | 98/54815 A1 | 12/1998 |
| WO | 2018/069637 A1 | 4/2018 |

\* cited by examiner

[Fig. 1]
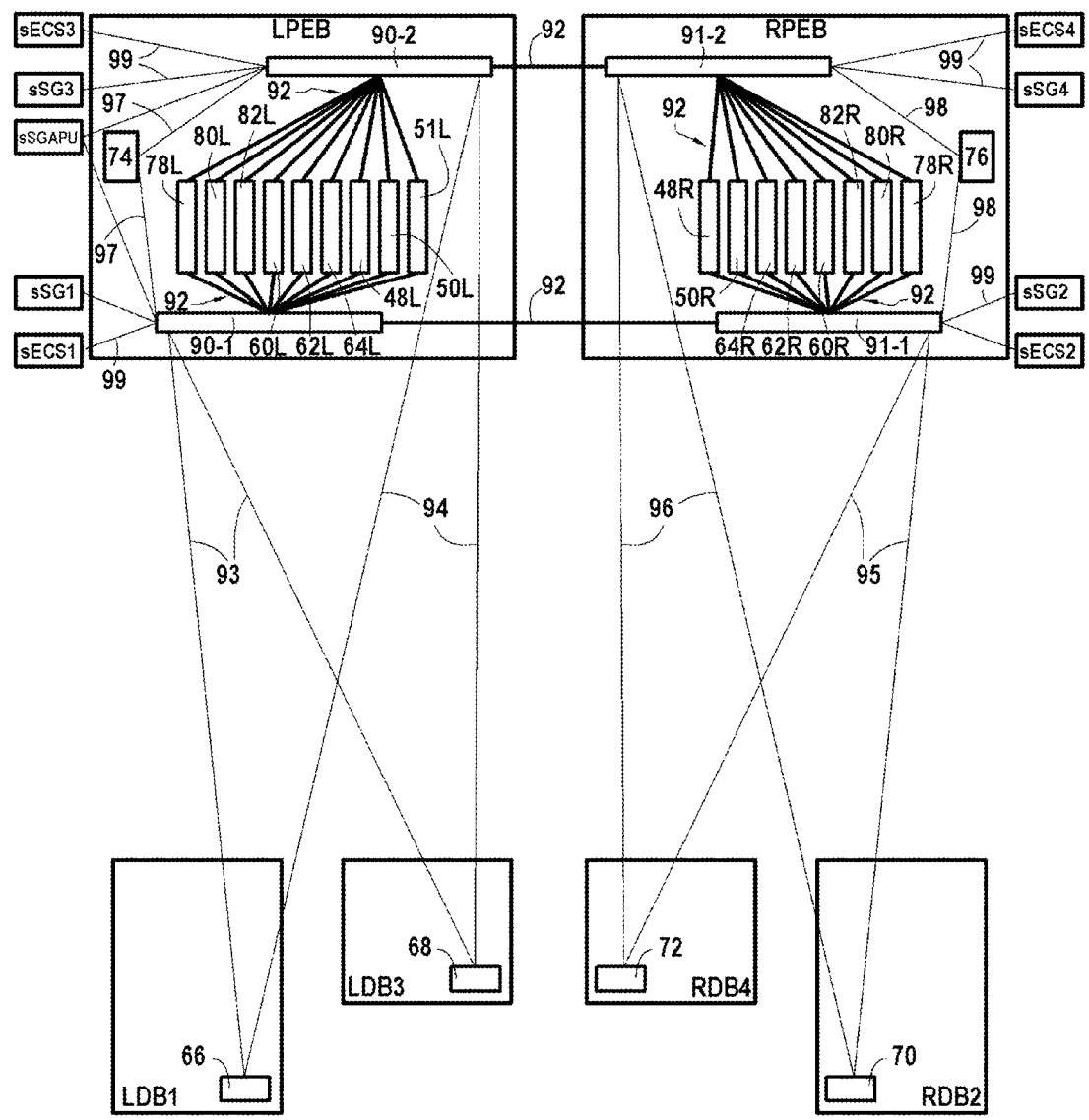

[Fig. 2]
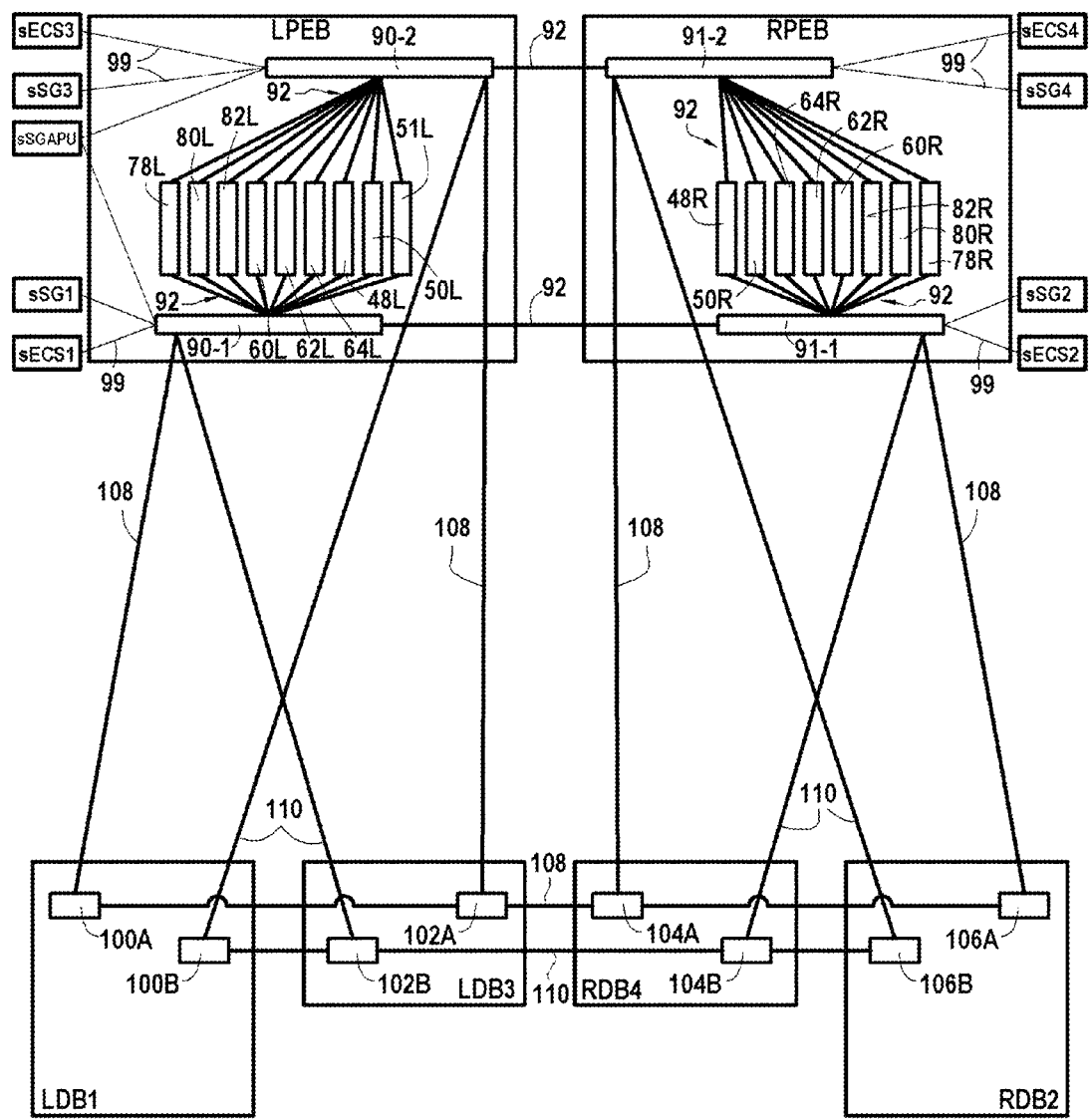

[Fig. 3]
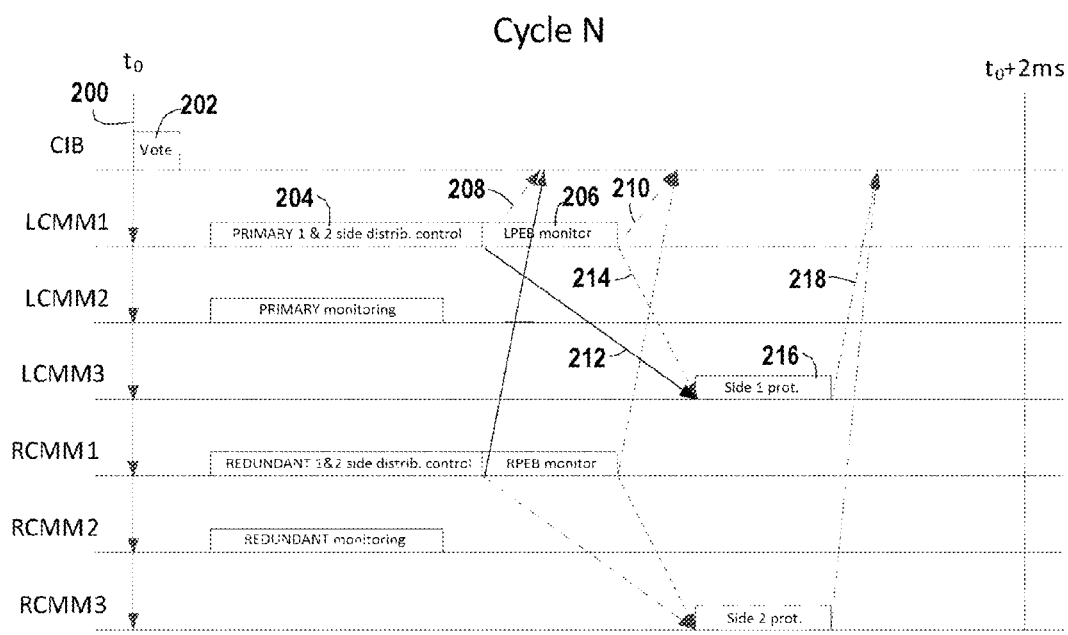

[Fig. 4]
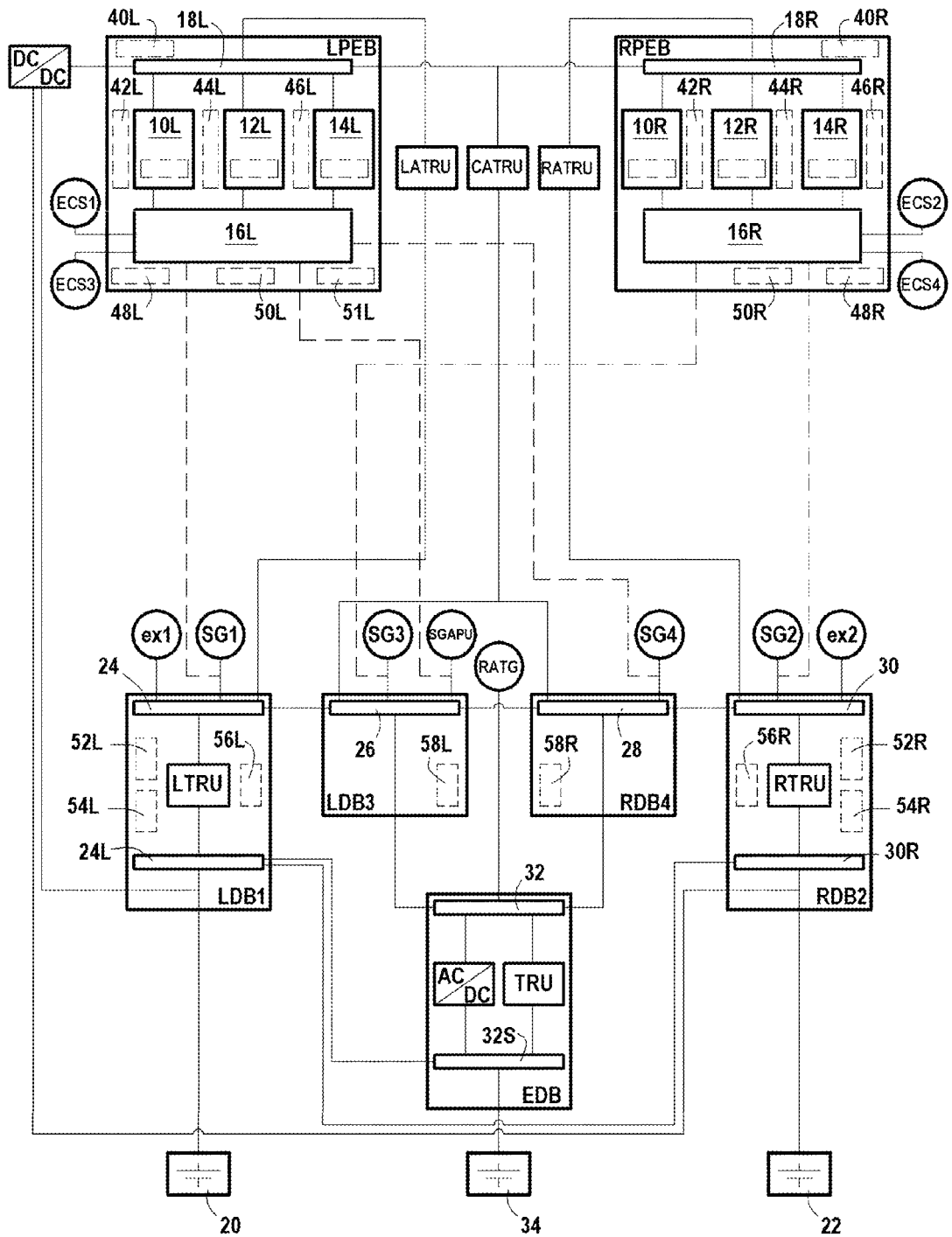
Prior Art

SYSTEM FOR CONTROLLING AN AIRCRAFT ELECTRICAL NETWORK

CROSS-REFERENCE TO RELATED APPLICATION(S)

This patent application is the U.S. National Stage entry under 35 U.S.C. § 371 of International Patent Application No. PCT/FR2020/050445, filed on Mar. 5, 2020, which claims the benefit of priority to French Patent Application No. 1902661, filed on Mar. 15, 2019.

TECHNICAL FIELD

This invention relates to the field of the electrification of aircrafts and specifically a system for controlling the aircraft power network.

BACKGROUND

The increasing electrification of commercial aircraft (air conditioning, landing gears, thrust reverser, de-icing etc.) places ever greater demands on the electrical system (increase in power, increase in availability, numerous operating modes).

Thus, aircraft manufacturers develop decentralized architectures making it possible to optimize the mass of the power cables by locating the distribution boxes as near to the loads as possible.

But these architectures have a negative impact on the system for controlling the power distribution since they lead to an increase in the number of electronics boards and the wiring associated with these boards, as shown in FIG. 4 which schematically illustrates a current electrical architecture of a commercial airplane with two propulsion assemblies.

In the example illustrated, which is in no way limiting, this power architecture includes five starter-generators: two per propulsion assembly (SG1, SG2, SG3, SG4) and one for an Auxiliary Power Unit APU (SGAPU), a ram air turbine generator (RATG), two ports for external power units (ex1, ex2), four electrical compressors of the air conditioning system (ECS1, ECS2, ECS3, ECS4), four electrical distribution boxes (LDB1, RDB2, LDB3, RDB4), an emergency box (EDB) and two power electronics boxes (LPEB, RPEB). The letter L refers to the left-hand side of the airplane and the letter R to the right-hand side.

Each power electronics box (LPEB or RPEB) is related to two electrical distribution boxes (LDB1 and LDB3 or RDB2 and RDB4) associated with a given propulsion assembly, one of these boxes being also associated with the auxiliary power unit.

The power electronics boxes are each equipped with at least three inverters 10L, 12L, 14L; 10R, 12R, 14R (a greater number may be necessary if the number of electrical motors is greater or if one wishes to improve the availability of the system) which delivers selectively (according to the position of a routing matrix 16L, 16R) an AC voltage based on a DC voltage coming from a DC bus bar 18L, 18R to the starter-generators SG1, SG2, SG3, SG4 of the propulsion assemblies and SGAPU of the auxiliary power unit or other driven electrical motors such as those driven, for example, electrical compressors ECS1, ECS2, ECS3, ECS4, as a function of speed and position information delivered by sensors internal to these different driven members. The inverters can drive any electrical motor, whether it be the starter-generators of the propulsion assemblies or the auxiliary power unit or the electrical compressors or else other electrical motors (not shown) of other systems of the aircraft (electrical taxiing, hydraulic system, fuel tank inerting system etc.).

The DC bus bars 18L and 18R of the two boxes are connected to one another through contact switches (not shown) making it possible to interconnect them or isolate them and are powered by DC/DC booster converter connected to batteries 20, 22 and to three rectifiers LATRU, RATRU and CATRU (the latter operating in the event of failure of one of the first two), the inputs of which are connected to the electrical distribution boxes, more precisely to AC bus bars 24, 26, 28, 30 of these four boxes which are connected to one another, each of these bus bars being further connected to a starter-generator of a given propulsion assembly or of the auxiliary power unit, at the time being used in generator mode. Of course, provision is made for contact switches (not shown) between each bus bar such that when each is powered by its main source, the contact switches are not closed and each bar is then isolated. The contact switch is closed to connect the bars when one of them is not powered and another power source associated with another bar is powering it.

One of the two electrical distribution boxes on the left-hand side LDB1 may include (as illustrated but an external link is also possible) a transformer/rectifier LTRU which delivers from the AC bus bar 24 a DC voltage for a DC bus bar 24L. Similarly, one of the two electrical distribution boxes of the right-hand side RDB2 may include (as illustrated but an external link is also possible) a transformer/rectifier RTRU which delivers from the AC bus bar 30 a DC voltage for a DC bus bar 30R. Both DC bus bars may be mutually connected by contact switches (not shown) in the event of failure of a transformer/rectifier. The two other AC bus bars 26, 28 of the last two electrical distribution boxes LDB3 and RDB4 power an AC bus bar 32 of the emergency box EDB which via a transformer/rectifier TRU delivers a DC voltage for a DC bus bar 32S connected to the DC bus bar of one of the electrical distribution boxes. The AC bus bar 32 of the emergency box is also powered by the ram air turbine generator RAT and by a DC/AC converter from the DC bus bar 32S connected to an emergency battery 34.

This standard electrical architecture includes a control system generally identical for the left- and right-hand sides which are independent and segregated from one another, each therefore taking its measurements independently of one another. The emergency box EDB on the other hand generally has an independent control system which is not illustrated.

Each power electronics box LPEB, RPEB has an integrated monitor 40L, 40R which provides the configuration of the three inverters 10L, 12L, 14L; 10R, 12R, 14R and of the contactors of the routing matrix 16L, 16R. For each side, left or right, provision is made for three boards 42L, 44L, 46L; 42R, 44R, 46R in the power electronics box to compute the command to be applied to each of the inverters, i.e. for the control of each power unit associated with and integrated into each inverter 10L, 12L, 14L; 10R, 12R, 14R (depicted as a block drawn in dotted lines inside each of these inverters) and executing local control as well as the measurements needed for this control. Each box further incorporates boards 48L, 50L, 51L; 48R, 50R for controlling the starter-generators used for regulating the output voltage of the generator in generator mod and for the specific control of the energizing in starter mode.

In both electrical distribution boxes LDB1, RDB2, two redundant boards 52L, 54L; 52R, 54R perform the computation of the commands and protections governing the contact switches and a voting module 56L, 58L, 56R, 58R disposed in each of the electrical distribution boxes and segregated from these computing boards, makes it possible to make a choice between orders coming from the two redundant boards.

However, the paralleling of the AC generators is a catastrophic event in safety terms if provision is not made for any synchronization device. Consequently, a source anti-paralleling protection is generally necessary to achieve functional safety targets. For these same safety reasons, the inputs of the anti-paralleling system must be dissimilar to those of the control. This is especially the case with the variable-frequency generators which are currently used in aerospace.

SUMMARY OF THE INVENTION

This invention aims to make provision for a new system for controlling an aircraft power network applied to a "more electric" airplane, i.e. incorporating new electrical functions a conventional airplane does not possess, and having a reduced mass and reinforced safety due to a lower number of components and the increase in the speed of data exchange. One aim of the invention is also to improve the availability of the power network of the airplane allowing multiple reconfigurations, without however complicating the control system.

For this purpose, provision is made for a system for controlling an aircraft power network comprising at least a first propulsion assembly having at least one left-hand starter-generator and a second propulsion assembly having at least one right-hand starter-generator as well as other electrical motors, a system characterized in that it comprises first and second power electronics boxes each including at least two so-called generic control electronics boards for controlling the power network, each of these at least two generic control electronics boards being connected by a fast communication link to separate first and second data switches, the first and second data switches of the first power electronics box being respectively connected to the first and second data switches of the second power electronics box by a first fast communication bus.

Thus, by resorting to a bus and fast communication links, one increases the rapidity of the data exchanges, one avoids communication by dedicated wires, which greatly increased the wiring and connectors and was penalizing in terms of mass and wiring cost, and it becomes possible to move the electronics boards from harsh environment areas to protected areas. Moreover, by resorting to generic electronic control boards instead of boards dedicated to controlling the inverters, and reconfigurations and pooling of functions is facilitated.

The control system also includes four electrical distribution boxes, two electrical distribution boxes being associated with a given propulsion assembly and each electrical distribution box including at least one so-called local interface electronics board for, firstly, acquiring data relating to the state of the electrical distribution boxes and secondly, controlling contact switches dedicated to each of these electrical distribution boxes and intended to provide the configuration of the power network.

According to the envisioned embodiment, the first and second power electronics boxes can each include a local interface electronics board connected to the first and second data switches of the power electronics box over a fast communication link and each electrical distribution box one single local interface electronics board, both local interface electronics boards of the two electrical distribution boxes associated with a given propulsion assembly being respectively connected to the first and second data switches of the power electronics box associated with this given propulsion assembly by fast communication links.

Advantageously, one of the three generic control electronics boards of each power electronics box also functions as a local interface electronics board and each electrical distribution box can also include first and second local interface electronics boards, each local interface electronics board of one and the same electrical distribution box being connected to a different data switch of one and the same power electronics box.

Preferably, the first local interface electronics boards of the two electrical distribution boxes associated with a given propulsion assembly are each connected to a different data switch of one and the same power electronics box and the first local interface electronics boards of each electrical distribution box are connected to one another and to the data switches by a second fast communication bus and the second local interface electronics boards of each electrical distribution box are connected to one another and to the data switches by a third fast communication bus.

Advantageously, the first, second and third fast communication bus are data buses of Etherfly® type of 100 Mbits/s to 1 Gbits/s.

The control system further comprises at least three control units for applying control orders to at least three inverters driving starter-generators and other electrical motors, these at least three control units each being connected to the data switches by a fast communication link, one power unit per starter-generator and other driven electrical motor to regulate its voltage, each power unit being connected to the data switches by a fast communication link, and digitization and communication units corresponding to each of the starter-generators and other driven electrical motors, to escalate the position of the rotor of each starter-generator and other electrical motor in order to allow them to be driven, each of these units being connected to the data switches by a fast communication link.

Preferably, at least one of the generic control electronics boards of the first and second power electronics boxes includes a different failure mode from the other generic control electronics boards of the same power electronics box.

Advantageously, each of the local interface electronics boards includes a voting circuit with three output states providing, as a function of orders coming from the generic control electronics boards, the control of switches connected to this local interface electronics board.

The invention also relates to the power network including the system as mentioned previously and the aircraft equipped with such a power network.

BRIEF DESCRIPTION OF THE DRAWINGS

Other features and advantages of this invention will become apparent from the detailed description given below, with reference to the following figures without any limitation and wherein:

FIG. 1 is a schematic representation of a first example of an architecture of a system for controlling an aircraft power network in accordance with the invention, FIG. 2 is a schematic representation of a second example of an architecture of a system for controlling an aircraft power network in accordance with the invention, FIG. 3 is a sequencing diagram representing an example of applications executed on the electronics boards of the invention, and FIG. 4 is a schematic representation of a power network of an aircraft and of its control system of the prior art.

DESCRIPTION OF THE EMBODIMENTS

FIG. 1 illustrates, by a first example, the principles of the control system of this invention applied to the known architecture previously described with reference to FIG. 4, that is to say with four electrical distribution boxes LDB1, LDB3, RDB4 and RDB2 and two power electronics boxes LPEB, RPEB.

This control system, which makes it possible to provide the control of the power network and the driving of the different electric motors of the aircraft, includes several electronics boards, control boards and power units. Six electronics boards 60L, 62L, 64L; 60R, 62R, 64R are so-called generic LCMM1, LCMM2, LCMM3; RCMM1, RCMM2, RCMM3 in that they are interchangeable (in the event of failure of one board, the functions supported by them can be disabled or loaded into another board unlike the prior art in which the boards each associated with a given function cannot be reconfigured). Six other electronics boards 66, 68, 70, 72, 74, 76 are known as local CIB and are associated with each of the boxes LDB1, LDB3, RDB2, RDB4 and the boxes LPEB, RPEB. At least three power units 78L, 80L, 82L; 78R, 80R, 82R are further provided to apply control orders to each inverter 10L, 12L, 14L; 10R, 12R, 14R providing the driving of the starter-generators and other electric motors of the aircraft. Finally, a number of control boards 48L, 50L, 51L; 48R, 50R corresponding to the number of the starter-generators of the propulsion assemblies and of the auxiliary power unit and where applicable of other driven motors, the output voltage of which is to be regulated (in generator mode), is also provided. Finally, corresponding digitization and communication units sSG1, sSG2, sSG3, sSG4, sSGAPU, sECS1, sECS2, sECS3, sECS4 are also present to escalate the position of the rotor of these starter-generators and other driven motors, in order to allow their driving. Conventionally such units are formed of position sensors of resolver or Hall-effect type.

The generic electrical boards host most of the control functions of the power network and the driving functions of the electric motors. They have no direct link with the interfaces to be controlled and monitored, which makes it possible to be independent of the number and type of interfaces (logic, analog, digital). This makes it possible to guarantee the generic nature of the board and allows it to support different functions, and particularly to easily reconfigure the functions of each board in the event of one of them being lost. The local interface electronics boards are in charge of locally collecting data relating to each box (states of the contact switches, voltages, currents, temperatures etc.) and to make them available to the other components of the system. They also apply the control orders received from the generic control electrical boards in order to configure the power network and, when these orders are several, they make decisions between the different orders according to a pre-established priority.

The control boards and power units which are already present in the control system of the prior art, in the same way as the position measurement units, do however, within the scope of the invention, have different interactions with the other boards, as will be explained hereinafter.

The exchanges and transfer of messages between these different electrical boards and units are specifically done through four data switches 90-1, 91-1, 90-2, 91-2 to which these boards, power units and digitization and communication units are connected, the data switches being connected to one another by a fast communication bus 92 of Etherfly® type, preferably 1 Gbits/s or other communication bus with the same priorities and performance over which all the data are exchanged unless functional safety restrictions require dedicated wires for reasons of independence or dissimilarity for example. Thus, the motor driving functions (starter-generators of the propulsion assemblies and of the auxiliary power unit and other driven motors), including the paralleling of the inverters for the driving of one and the same motor, and the functions of generation, distribution and protection of the power network impose performance constraints on the fast communication bus which require the setting-up of control loops in the order of a few tens of microseconds up to a few milliseconds, the different boards being synchronized with one another with an accuracy adapted to the desired control periods by means of a local clock and information accessible from the fast communication bus. It will for example be noted that certain functions, such as the paralleling of the inverters, require synchronization performance in the order of 50 nanoseconds whereas others have less stringent requirements.

Specifically, each of the power electronics boxes LPEB (or RPEB) includes two data switches 90-1, 90-2 (or 91-1, 91-2 respectively) one connected to each input/output of the electronics boards 60L, 62L, 64L (60R, 62R, 64R respectively), of the power units 78L, 80L, 82L (78R, 80R, 82R respectively) and of the control boards 48L, 50L, 51L (48R, 50R respectively), and the other to each other input/output, the data switches disposed at one input/output 90-2, 91-2 being connected to one another and the data switches disposed at the other input/output 90-1, 91-1 being also connected to one another. All the aforementioned links are preferably made through the fast communication bus 92 (the links to the power units and the control boards can be made at a lower bitrate, however). The electrical distribution boxes, meanwhile, are connected to the data switches by less fast communication links, typically buses of Etherfly® type, preferably at 100 Mbits/s. More precisely, the electrical distribution boxes LDB1 and LDB3 are both connected by the links 93 to the first data switch 90-1 of the power electronics box LPEB and by the links 94 to the second data switch 90-2 of the power electronics box LPEB. Similarly, the electrical distribution boxes RDB2 and RDB4 are both connected by the links 95 to the third data switch 91-1 of the power electronics box RPEB and by the links 96 to the fourth data switch 91-2 of the power electronics box RPEB.

Similarly, the different digitization and communication units are connected to these two data switches by fast communication links 99.

FIG. 2 illustrates a second example of an architecture in accordance with the invention, but wherein the configuration of the local interface boards is different (the other boards or units identical to the previous architecture will not be described again). Specifically, in this configuration each electrical distribution box LDB1, LDB3; RDB2, RDB4 no longer has a single local interface electronics board but first 100A, 102A, 104A, 106A and second 100B, 102B, 104B, 106B local interface electronics boards, each local interface electronics board of one and the same electrical distribution box being connected to a different data switch of one and the same power electronics box LPEB, RPEB. The first local interface electronics boards of each electrical distribution box are connected to one another and to the data switches to which they are connected by a fast communication bus 108 and, in the same way, the second local interface electronics boards of each electrical distribution box are connected to one another and to the data switches to which they are connected, also by a fast communication bus, 110. These two fast communication buses, which are independent (i.e. segregated from one another) and which allow the simple management of redundancies at the level of the contact switches dedicated to the electrical distribution boxes, are typically data buses of Etherfly® type of 100 Mbits/s to 1 Gbits/s or analog. The bus 108 is for example dedicated to controlling the contact switches and the bus 110 to the protection and acquisition of data (particularly the taking of measurements) relating to the state of the electrical distribution boxes.

More precisely, the first local interface electronics boards 100A, 102A (104A, 106A) of the two electrical distribution boxes LDB1, LDB3 (RDB4, RDB2 respectively) associated with a given propulsion assembly are each connected to a different data switch 90-1, 90-2 (91-1, 91-2 respectively) of one and the same power electronics box LPEB (RPEB respectively). Note that in this configuration, it may be advantageous at the level of the power electronics boxes LPEB, RPEB to incorporate the local interface function initially present in the local interface electronics boards 74, 76 into one of the generic control electrical boards 60L, 62L, 64L; 60R, 62R, 64R thus providing for the generic control electrical board chosen a more general monitoring function. Thus, each power electronics box will include two generic boards dedicated exclusively to the driving of the electrical motors (SG1, SG2, SG3, SG4, SGAPU and ECS1, ECS2, ECS3, ECS4) and this monitoring board providing both the configuration of the generic boards of the box in question and the control of the operation of the contact switches of this box.

In both of the configurations illustrated previously, this control system has the aim of performing different functions by means of associated application software executed cyclically with a period T (typically between 50 microseconds for fast functions and 2 milliseconds for slow functions), namely so-called "Left and right-hand engine control" functions, so-called "PRIMARY and REDUNDANT left and right-hand distribution control", a so-called "LPEB Monitor" function, a so-called "RPEB Monitor" function, so-called "Left and right-hand distribution protection" segregated functions, and so-called "PRIMARY and REDUNDANT left and right-hand system monitoring" segregated functions.

The "Left and right-hand engine control" functions perform the computation of the cyclic ratio to be applied to each of the arms of the inverter bridge. This cyclic ratio is recomputed and emitted at the chopping frequency, each of the boards 60L, 62L, 64L (LCMM1, 2 and 3) for the left-hand side and each of the boards 60R, 62R, 64R (RCMM1, 2 and 3) for the right-hand side, having the ability to drive the three inverters on their respective sides alone or in parallel.

The "PRIMARY and REDUNDANT left and right-hand distribution control" functions provide the control of the different contact switches (not shown in the drawings for convenience) such as the connecting contact switches between different generation channels, the authorization to close the line contact switches of the generators, the control of the ground power unit contact switches. These two functions perform the same computations on the basis of the same information (the PRIMARY and REDUNDANT channels have one and the same view of the state of the network) and transmit the control orders to the local interface electronics boards 66-76 for application. The resolution between the two controls is performed in the local interface electronics board by a voting circuit as will be detailed below.

The "LPEB Monitor" function performs the configuration of the generic electronics boards 60L, 62L, 64L and of the three corresponding inverters 10L, 12L, 14L to allocate the computational and power electronics resources to the load-driving requirements (motor start-up and ECS) and the configuration of the network of contact switches of the routing matrix 16L to route the inverters toward the associated starter-generators SG1, SG3, the APU and the compressors ECS1 and ECS3.

The "RPEB Monitor" function performs the configuration of the generic electronics board 60R, 62R, 64R and of the three corresponding inverters 10R, 12R, 14R to allocate the computational and power electronics resources to the load-driving requirements (motor start-up and ECS) and the configuration of the network of contact switches of the routing matrix 16R to route the inverters to the associated starter-generators SG2 and SG4 and the compressors ECS2 and ECS4.

The "Left and right-hand distribution protection" segregated functions centralize all the protectors within the scope of the distribution system for the left side and the right side respectively and in particular the anti-paralleling between generators (VFSG and external units), the anti-paralleling between loads of the left-hand power electronics box LPEB, or right power electronics box RPEB respectively, the protection from leakage currents on the power cables between the distribution units LDB1 and LDB3, LDB3 and RDB4, and between LDB1 and RDB2 and the protection of the two external units ex1 and ext.

The "PRIMARY and REDUNDANT left and right-hand system monitoring" segregated functions collect, one for the left side, the other for the right side, the information from the distribution system and transmits it for the cockpit display, and performs the monitoring and fault diagnostics of the distribution system. The correspondence table below summarizes these different functions for each of the electrical boards. The left-hand side is written in the table "side 1" and the right-hand side "side 2".

TABLE 1

|  | LCMM1 | LCMM2 | LCMM3 | RCMM1 | RCMM2 | RCMM3 |
|---|---|---|---|---|---|---|
| Side 1 engine control | X | X | X |  |  |  |
| Side 2 engine control |  |  |  | X | X | X |
| PRIMARY 1&2 side distribution control | X | in the event of failure of LCMM1 |  |  |  |  |
| REDUNDANT 1&2 side distribution control |  | in the event of failure of RCMM1 |  | X |  |  |

TABLE 1-continued

|  | LCMM1 | LCMM2 | LCMM3 | RCMM1 | RCMM2 | RCMM3 |
|---|---|---|---|---|---|---|
| LPEB monitor | X | in the event of failure of LCMM1 |  |  |  |  |
| RPEB monitor |  | in the event of failure of RCMM1 |  | X |  |  |
| Side 1 distribution protection |  |  | X |  | in the event of failure of LCMM3 |  |
| Side 2 distribution protection |  |  |  |  | in the event of failure of RCMM3 | X |
| PRIMARY 1&2 side system monitoring |  | X |  | in the event of failure of LCMM2 |  |  |
| REDUNDANT 1&2 side system monitoring |  |  |  | in the event of failure of RCMM2 | X |  |

Note that in this architecture, the boards LCMM1/LCMM2/RCMM1 are dissimilar from the boards LCMM3/RCMM2/RCMM3 in the sense that their electronic technology and design and codes are different enough to not have any common failure modes. Specifically, the "Catastrophic" classification of the paralleling of two variable-frequency generators (VFSG) requires the anti-paralleling protection and the control to be supported by different and dissimilar boards.

At the level of the local interface electronics boards 66-76, a voting circuit with three output states provides the interface with each contact switch (not shown) controlled by the board, as per the choice table below, with the control orders (up to two inputs CTRL1 and CTRL2) and protection orders (one input PROT) coming from the generic electrical boards 60L-64R and following the following logic: X: any state; 0: state 0; 1: state 1; No data: unavailability of a valid datum, for the inputs and 0: contact switch to be commanded to open; 1: contact switch to be commanded to close; No change: the command of the contact switch remains in the previous valid state, for the output of the voter (output).

TABLE 2

|  | PROT | CTLR1 | CTLR2 | Output |
|---|---|---|---|---|
| INIT | X | X | X | 0 |
|  | 0 or No data | 0 | 0 | 0 |
|  | 0 or No data | 0 | 1 | No change |
|  | 0 or No data | 1 | 0 | No change |
|  | 0 or No data | 1 | 1 | 1 |
|  | 1 | X | X | 0 |
|  | 0 or No data | No data | 0 | 0 |
|  | 0 or No data | No data | 1 | 1 |
|  | 0 or No data | 0 | No data | 0 |
|  | 0 or No data | 1 | No data | 1 |
|  | 0 or No data | No data | No data | 0 |

The following table illustrates the link between the functions of the system and the inputs of the voters (N/A meaning non-applicable).

TABLE 3

|  | CTL1 | CTL2 | PROT |
|---|---|---|---|
| LDB1/LDB3 contact switches driven by the distribution system (i.e. out of line contact switches) | PRIMARY 1&2 side distribution control | REDUNDANT 1&2 side distribution control | Side 1 distribution protection |
| LPEB contact switches | LPEB monitor | N/A |  |
| RDB2/RDB4 contact switches driven by the distribution system (i.e. out of line contact switches) | PRIMARY 1&2 side distribution control | REDUNDANT 1&2 side distribution control | Side 2 distribution protection |
| RPEB contact switches | RPEB monitor | N/A |  |

Thus, with this invention, one obtains better tolerance to erroneous results on CTRL1 or CTRL2 when both are received by the local interface electronics board (both functions must be coherent for the modification to be applied by the voter), better tolerance to the loss of CTRL1 or CTRL2 since the remaining function keeps the control of the contact switch, a better limitation of the impact of an erroneous result on PROT, since the protection functions have a scope limited to a single side, left or right, a better tolerance to the loss of PROT, since CTRL1 and CTRL2 keep control of the contact switch.

Certain network protection functions which then act to correct an error of the control functions (for example the anti-paralleling), the embodiment of the voter must guarantee the absence of any common point between CTRL1/CTRL2 on the one hand and PROT on the other. This can for example be produced by making the functions CTRL1/2 and PROT be supported by different logic components on the same local board.

FIG. 3 shows in the form of a time-based diagram a sequential representation of the applications executed, for example by software, on an appropriate processor of the different electrical boards CIB and CMM (of course an execution on programmable logic components, for example of FPGA type, can be envisioned).

At t0 at the start of the cycle N (reference 200), the local interface electronics boards (CIB) send to the six generic electronics boards (CMM) the acquisitions made in the cycle N−1. The CIBs then compute the control order of the contact switches by making a vote (202) on the control and protection commands received in cycle N−1. Over the cycle N, the PRIMARY and REDUNDANT left and right distribution control functions (204) and LPEB and RPEB monitor (206) control functions are successively executed based on the acquisitions transmitted by the local boards CIB (cycle N−1) and transmit the result to these same local boards CIB (208, 210) and to the left and right-hand distribution protection functions (212, 214). Then, the left and right-hand distribution protection functions (216) execute and transmit their results to the local boards CIB (218) which will be applied to the cycle N+1. Thus, the reaction to an event on the power network will occur at the earliest 2 cycles after this event.

Note that the left and right-hand distribution protection functions have the possibility to intercept the result of the left and right-hand distribution control functions before it is acted on by the local boards CIB.

Note also that if the distribution and monitor functions have been executed successively in the illustrated example, an execution in parallel is of course also possible, the sending of the messages being also done at the end of each task as in the sequential mode.

Thus, with the invention, the transfer of data between equipment is maximized by the presence of the fast communication bus in the aim of reducing the number of wires (savings in mass and wiring cost), allowing easy reconfigurations and reducing the quantity of certain items of equipment in the network by pooling them for several functions, in particular in the power electronics boxes and the electrical distribution boxes.

Thus, it will also be noted that if the different generic control electrical boards and the data switches have been described as power electronics boxes LPEB and RPEB, this does not mean that they are necessarily included in these boxes and it must be understood that these can also be physically disposed in control modules independent of these boxes, which then has the advantage of positioning the computation boards in a protected environment.

The invention claimed is:

1. A system for controlling an aircraft power network comprising at least a first propulsion assembly having at least one left-hand starter-generator and a second propulsion assembly having at least one right-hand starter-generator as well as other electrical motors, the system comprising first and second power electronics boxes each including at least two generic control boards for controlling the power network, each of these at least two generic control electronics boards being connected by a fast communication link to separate first and second data switches, the first and second data switches of the first power electronics box being respectively connected to the first and second data switches of the second power electronics box by a first fast communication bus, the system further comprising four electrical distribution boxes, two electrical distribution boxes being associated with a given propulsion assembly and each electrical distribution box including at least one so-called local interface electronics board for, firstly, acquiring data relating to the state of the electrical distribution boxes and secondly, controlling contact switches dedicated to each of these electrical distribution boxes and intended to provide the configuration of the power network.

2. The control system as claimed in claim 1, wherein, moreover, the first and second power electronics boxes each include a local interface electronics board connected to the first and second data switches of the power electronics box over a fast communication link and each electrical distribution box includes one single local interface electronics board and both local interface electronics boards of the two electrical distribution boxes associated with a given propulsion assembly are respectively connected to the first and second data switches of the power electronics box associated with this given propulsion assembly by fast communication links.

3. The control system as claimed in claim 1, wherein one of the three generic control electronics boards of each power electronics box also functions as a local interface electronics board and each electrical distribution box can also include first and second local interface electronics boards, each local interface electronics board of one and the same electrical distribution box being connected to a different data switch of one and the same power electronics box.

4. The control system as claimed in claim 3, wherein the first local interface electronics boards of the two electrical distribution boxes associated with a given propulsion assembly are each connected to a different data switch of one and the same power electronics box.

5. The control system as claimed in claim 3, wherein the first local interface electronics boards of each electrical distribution box are connected to one another and to the data switches by a second fast communication bus and the second local interface electronics boards of each electrical distribution box are connected to one another and to the data switches by a third fast communication bus.

6. The control system as claimed in claim 1, wherein the first, second and third fast communication bus are data buses of 100 Mbits/s to 1 Gbits/s.

7. The control system as claimed in claim 1, further comprising at least three control units for applying control orders to at least three inverters driving starter-generators and other electrical motors, these at least three control units each being connected to the data switches by a fast communication link.

8. The control system as claimed in claim 1, further comprising one electronics board per starter-generator or other driven electrical motor to regulate its voltage, each power unit being connected to the data switches by a fast communication link.

9. The control system as claimed in claim 1, further comprising digitization and communication units corresponding to each of the starter-generators and other driven electrical motors, to escalate the position of the rotor of each starter-generator and other electrical motor in order to allow them to be driven, each of these units being connected to the data switches by a fast communication link.

10. The control system as claimed in claim 1, wherein at least one of the generic control electronics boards of the first and second power electronics boxes includes a different failure mode from the other generic control electronics boards of the same power electronics box.

11. The control system as claimed in claim 1, wherein each of the local interface electronics boards includes a voting circuit with three output states providing, as a function of orders coming from the generic control electronics boards, the control of switches connected to this local interface electronics board.

12. The aircraft power network including a control system as claimed in claim 1.

13. An aircraft including the power network as claimed in claim 12.

* * * * *